(12) United States Patent
Jordan

(10) Patent No.: US 7,665,750 B2
(45) Date of Patent: Feb. 23, 2010

(54) TRUNNION AIR RIDE SUSPENSION SYSTEM

(75) Inventor: Gregory Jordan, Gatesville, TX (US)

(73) Assignee: Watson & Chalin Maufacturing, Inc., McKinney, TX (US)

( * ) Notice: Subject to any disclaimer, the term of this patent is extended or adjusted under 35 U.S.C. 154(b) by 636 days.

(21) Appl. No.: 11/051,687

(22) Filed: Feb. 4, 2005

(65) Prior Publication Data
US 2006/0175806 A1 Aug. 10, 2006

(51) Int. Cl.
*B60G 3/008* (2006.01)
(52) U.S. Cl. .......................... 280/124.111; 280/124.128
(58) Field of Classification Search .......... 280/124.128, 280/124.153, 124.11, 124.111, 124.116
See application file for complete search history.

(56) References Cited

U.S. PATENT DOCUMENTS

| | | | | |
|---|---|---|---|---|
| 2,493,022 A | * | 1/1950 | Pointer | 280/676 |
| 2,493,023 A | * | 1/1950 | Pointer | 280/685 |
| 2,495,933 A | * | 1/1950 | King | 188/204 R |
| 2,823,926 A | * | 2/1958 | Stover | 280/676 |
| 2,913,252 A | | 11/1959 | Norrie | |
| 3,406,980 A | | 10/1968 | Murray | |
| 3,502,348 A | * | 3/1970 | Bellamy et al. | 280/86.75 |
| 3,807,752 A | * | 4/1974 | Mauck | 280/81.1 |
| RE32,486 E | * | 9/1987 | Raidel, Jr. | 280/86.75 |
| 6,131,930 A | | 10/2000 | Chalin | |
| 6,241,266 B1 | * | 6/2001 | Smith et al. | 280/124.116 |
| 6,286,857 B1 | * | 9/2001 | Reese et al. | 280/683 |
| 6,439,587 B2 | | 8/2002 | Fabris | |
| 6,460,872 B2 | * | 10/2002 | Cadden | 280/678 |
| 6,557,875 B2 | * | 5/2003 | Schlosser et al. | 280/124.153 |
| 6,805,369 B2 | * | 10/2004 | Galazin | 280/124.116 |
| 6,942,232 B1 | * | 9/2005 | McGhie | 280/124.112 |
| 7,077,410 B2 | * | 7/2006 | Gregg et al. | 280/124.13 |
| 2001/0020775 A1 | | 9/2001 | Pierce et al. | |
| 2002/0135151 A1 | | 9/2002 | Schlosser et al. | |

* cited by examiner

*Primary Examiner*—Paul N. Dickson
*Assistant Examiner*—Timothy Wilhelm
(74) *Attorney, Agent, or Firm*—Smith IP Services, P.C.

(57) ABSTRACT

A trunnion air ride suspension system. In one example, a trunnion suspension system includes a trunnion beam pivotably mounted to a hanger bracket, and an axle pivotably mounted to the trunnion beam. A brake actuator is secured to the axle and pivotably mounted to the trunnion beam, so that the brake actuator pivots with the axle relative to the trunnion beam. In another example, a trunnion suspension system includes a trunnion beam pivotably mounted to a hanger bracket, the trunnion beam having a longitudinally extending cylindrical portion positioned between two generally vertical plate portions. An axle is pivotably mounted to the cylindrical portion by a bushed connection, the bushed connection being retained longitudinally between the plate portions.

22 Claims, 7 Drawing Sheets

TRUNNION AIR RIDE SUSPENSION SYSTEM

BACKGROUND

The present invention relates generally to vehicle suspension systems and, in an embodiment described herein, more particularly provides a trunnion air suspension system.

Trunnion suspension systems are used for transporting very heavy loads, since they distribute a load among a larger number of sets of wheels/tires than other suspension systems, and axles separately connected to frame rails can move independently of each other in a trunnion suspension system. In general, a conventional trunnion suspension system includes an axle attached to each frame rail, with two wheel/tire sets mounted to each axle. One wheel/tire set is mounted inboard of the frame rail, and the other wheel/tire set is mounted outboard of the frame rail, on each axle.

An example of a trunnion suspension system is described in U.S. Pat. No. 3,406,980, the entire disclosure of which is incorporated herein by this reference.

In order to increase load carrying capacity, multiple trunnion suspension systems are typically stacked longitudinally along the frame rails. Thus, it is very desirable for a trunnion suspension system to be longitudinally compact, so that multiple suspension systems can be accommodated conveniently along the frame rails as needed to support and distribute the required load.

There is also a need for trunnion suspension systems to be laterally compact, since the suspension systems must traverse public roadways which are limited in width. For this reason, the sets of wheels mounted on each axle are typically spaced close together straddling the frame rail, with very little space between the wheel sets. This has created a problem for mounting brake chambers or brake actuators between the wheel sets.

Some manufacturers have attempted to solve this problem by mounting only one brake actuator between the wheel sets. Unfortunately, in some instances a single brake actuator does not provide sufficient force to generate enough braking, particularly when very large loads are being transported. Other manufacturers have mounted multiple brake actuators to the trunnion beam behind the wheel sets. However, when the axle rotates relative to the trunnion beam, the brake actuators do not rotate, and so a brake actuator rod extending between a brake actuator and a brake camshaft is twisted, which leads to improper operation of, and possible damage to, the brakes.

There is also a need for trunnion suspension systems to be more conveniently serviced. In typical trunnion suspension systems, a hub and drum must be removed prior to removing a brake slack adjuster arm. This increases the cost of maintaining such suspension systems.

Thus, it may be seen that improvements are needed in the art of trunnion suspension systems. It is an object of the present invention to provide such improvements.

SUMMARY

In carrying out the principles of the present invention, in accordance with one of multiple embodiments described below, a trunnion suspension system is provided which solves the above problems in the art. In the suspension system, brake actuators are positioned rearward of the wheel sets, but they also pivot relative to the trunnion beam along with the axle, so that the brake actuator rods are not twisted.

In one aspect of the invention, a trunnion suspension system is provided which includes a trunnion beam pivotably mounted to a hanger bracket, and an axle pivotably mounted to the trunnion beam. A brake actuator is secured to the axle and pivotably mounted to the trunnion beam, so that the brake actuator pivots with the axle relative to the trunnion beam.

In another aspect of the invention, a trunnion suspension system is provided which includes a trunnion beam pivotably mounted to a hanger bracket, the trunnion beam having a longitudinally extending cylindrical portion positioned between two generally vertical plate portions. An axle is pivotably mounted to the cylindrical portion by a bushed connection, the bushed connection being retained longitudinally between the plate portions.

In yet another aspect of the invention, a trunnion suspension system is provided which includes a trunnion beam pivotably mounted to a hanger bracket and an axle pivotably mounted to the trunnion beam. A brake camshaft is releasably secured to the axle. The brake camshaft is removable from the axle without removal of a brake drum from the axle.

These and other features, advantages, benefits and objects of the present invention will become apparent to one of ordinary skill in the art upon careful consideration of the detailed description of representative embodiments of the invention hereinbelow and the accompanying drawings.

DETAILED DESCRIPTION

Figure 1:
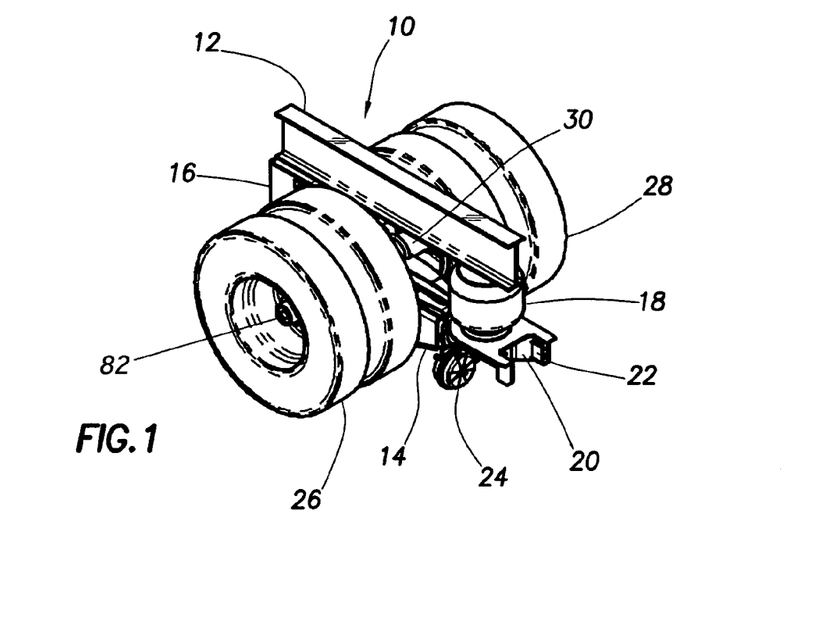
FIG. 1 is an isometric view of a trunnion suspension system embodying principles of the present invention.

Representatively illustrated in FIG. 1 is a trunnion suspension system 10 which embodies principles of the present invention. In the following description of the suspension system 10 and other apparatus and methods described herein, directional terms, such as "above", "below", "upper", "lower", etc., are used for convenience in referring to the accompanying drawings. Additionally, it is to be understood that the various embodiments of the present invention described herein may be utilized in various orientations, such as inclined, inverted, horizontal, vertical, etc., and in various configurations, without departing from the principles of the present invention. The embodiments are described merely as examples of useful applications of the principles of the invention, which is not limited to any specific details of these embodiments.

The suspension system 10 is depicted in FIG. 1 mounted to a longitudinally extending frame rail 12 of a vehicle, such as a trailer. Another identical suspension system is mounted to another frame rail which is positioned parallel to the frame rail 12 shown in FIG. 1, so that the two suspension systems 10 are laterally opposite each other. Only one of the suspension systems 10 is illustrated for convenience and clarity of description.

The suspension system 10 includes a trunnion beam 14 pivotably connected at its forward end to a hanger bracket 16 which is attached to, and extends downwardly from, the frame rail 12. An air spring 18 is positioned between the frame rail 12 and a rearward end of the trunnion beam 14 to suspend the frame rail above the trunnion beam.

As depicted in FIG. 1, the rearward end of the trunnion beam 14 has a vertically oriented U-shaped cavity 20 for receiving another hanger bracket 16 therein when another suspension system 10 is mounted behind the suspension system illustrated in FIG. 1. Pads 22 are provided in the cavity 20 for sliding contact with the hanger bracket 16. Of course, if another suspension system 10 is not mounted behind the suspension system illustrated in FIG. 1, then the cavity 20 may engage a bracket or other structure 80 (see FIG. 4) other than the hanger bracket 16, or it may not be provided.

Figure 2:
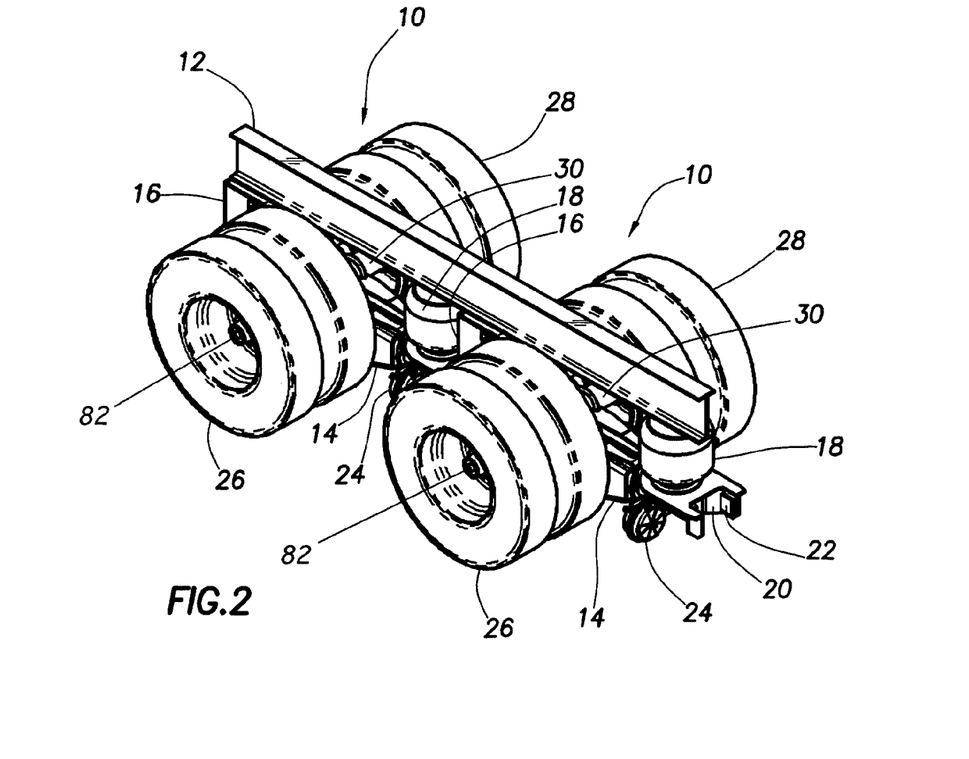
FIG. 2 is an isometric view of multiple interconnected trunnion suspension systems of FIG. 1.

In FIG. 2, two of the suspension systems 10 are depicted stacked longitudinally along the frame rail 12. As described above, the hanger bracket 16 of the rear suspension system 10 is received in the cavity 20 of the front suspension system. This helps to laterally align the trunnion beam 14 of the front suspension system 10 to prevent it from "walking" off to the side and placing additional stress on the pivot connection between the trunnion beam 14 and the hanger bracket 16.

Referring again to FIG. 1, note that a brake actuator 24 is pivotably attached to the trunnion beam 14 and is positioned rearward of two wheel sets 26, 28. Preferably, two brake actuators 24 are pivotably attached to each trunnion beam 14, although only one is visible in FIG. 1. The brake actuators 24 are mounted so that they rotate about the trunnion beam 14, as described in more detail below.

Each of the wheel sets 26, 28 includes two wheels and tires. The wheel set 26 is mounted inboard of the frame rail 12, and the wheel set 28 is mounted outboard of the frame rail. Other numbers of wheels and tires may be used, if desired.

The wheel sets 26, 28 are mounted at opposite ends of an axle 30 using conventional wheel hubs 82. The axle 30 is pivotably mounted to the trunnion beam 14 so that, if one of the wheel sets 26, 28 is raised or lowered relative to the other wheel set, or if the wheel sets otherwise need to pivot relative to the frame rail 12, then the axle will pivot about the trunnion beam.

Figure 3:
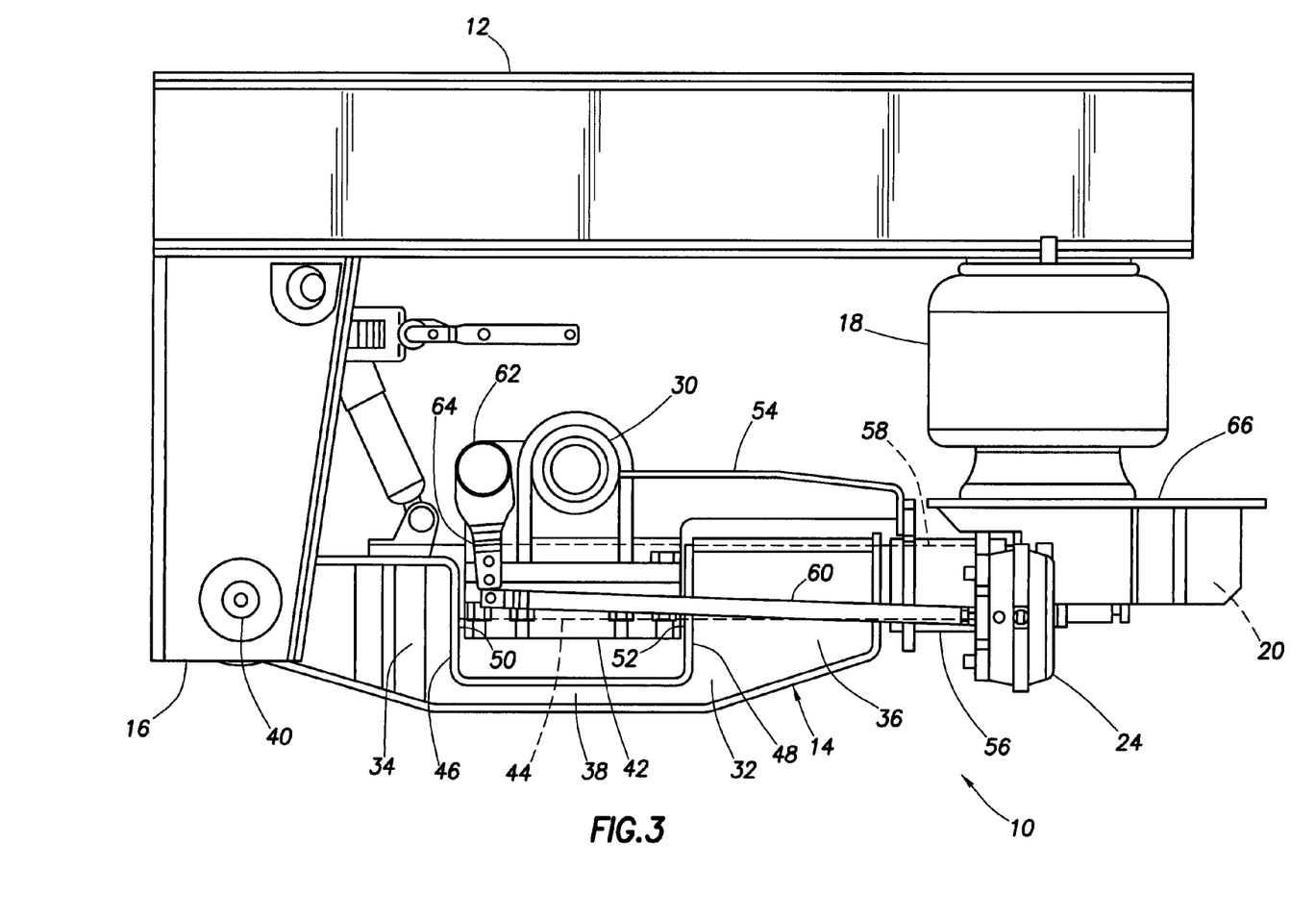
FIG. 3 is an enlarged scale side view of the trunnion suspension system.

Referring now to FIG. 3, the suspension system 10 is depicted from a side view with the wheel sets 26, 28 removed for clarity of illustration. In this view it may be seen that the trunnion beam 14 includes a generally U-shaped box section 32 having upwardly extending and longitudinally elongated legs 34, 36, and a longitudinally extending generally horizontal box portion 38 connecting the legs.

The forward leg 34 is pivotably connected to the hanger bracket 16 at a pivot connection 40. As described below, the pivot connection 40 may be adjustable to thereby position the trunnion beam 14 longitudinally relative to the hanger bracket 16.

The axle 30 is pivotably mounted to the trunnion beam 14 by means of a bushed connection 42 which encircles a cylindrical portion 44 of the trunnion beam extending longitudinally between the legs 34, 36 parallel to the portion 38. The connection 42 is positioned longitudinally between two generally vertically oriented plates 46, 48 of the legs 34, 36 which form shoulders 50, 52 for retaining the connection therebetween.

A bracket 54 extends longitudinally rearward from the axle 30 and connection 42 and is connected to a sleeve 56 which encircles another cylindrical portion 58 of the trunnion beam 14. The cylindrical portions 44, 58 may be portions of a same cylindrical structure which extends through the trunnion beam 14.

The brake actuators 24 are attached to the sleeve 56. Note that the sleeve 56 will rotate about the trunnion beam 14 with the pivot connection 42, due to the bracket 54 connected therebetween. In this manner, the brake actuators 24 also rotate about the trunnion beam 14 with the axle 30.

A brake actuator rod 60 is connected between each brake actuator 24 and a brake camshaft 62 via a slack adjuster arm 64. The camshaft 62 may have cams known to those skilled in the art as "S cams" for actuating brakes of the suspension system 10. As described below, the camshaft 62 and arm 64 are preferably releasably attached to the axle 30 for ease of maintenance.

One beneficial feature of the suspension system 10 is that the actuator rod 60 is not twisted or otherwise displaced relative to the axle 30 or brake actuator 24 when the axle pivots about the trunnion beam 14. This is due to the fact that the brake actuator 24 pivots with the axle 30.

The air spring 18 is mounted to the trunnion beam 14 by means of a platform 66 attached to a rearward end of the cylindrical portion 58. The cavity 20 is formed in a rearward end of the platform 66.

Figure 4:
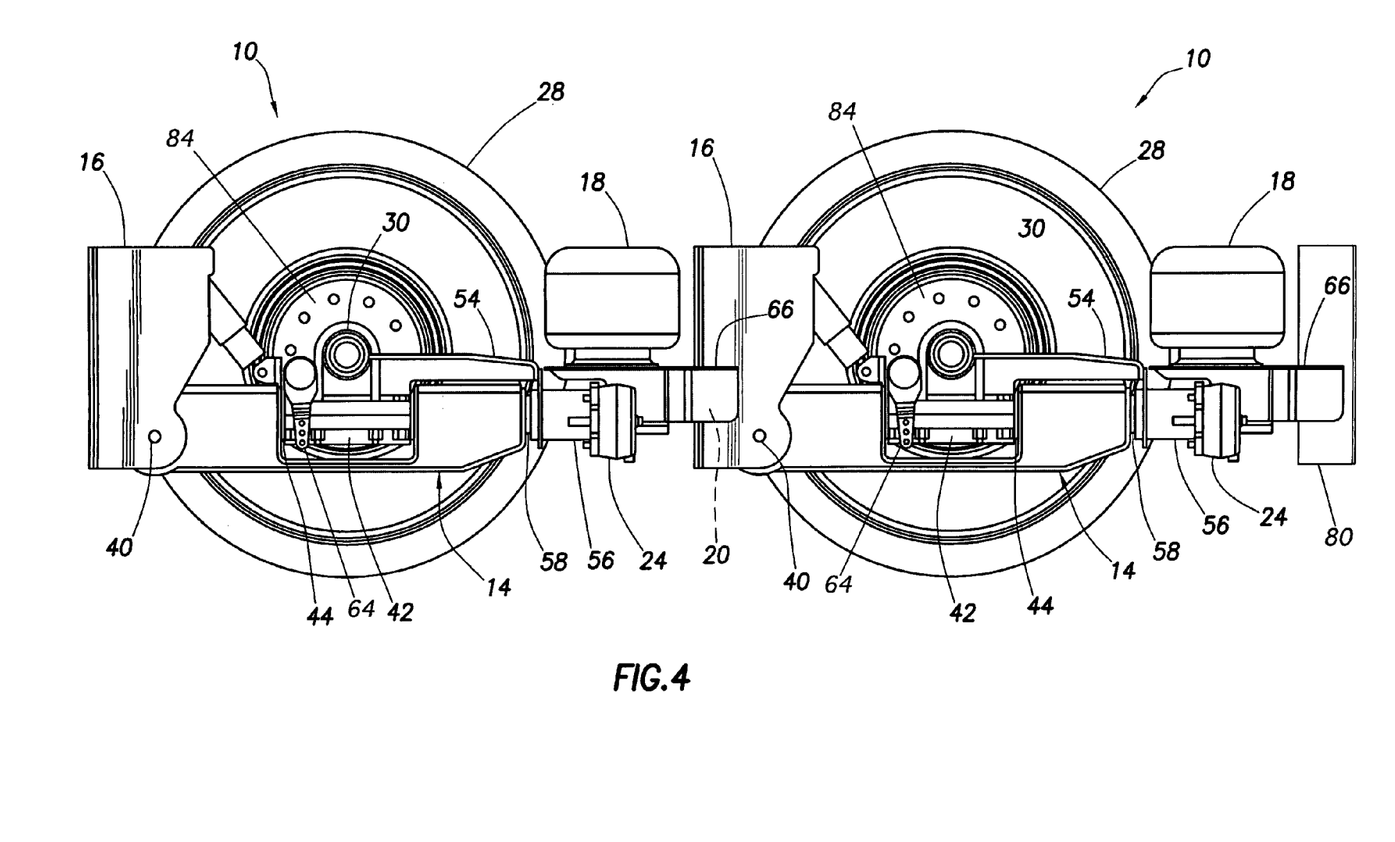
FIG. 4 is a side view of multiple interconnected trunnion suspension systems.

Referring now to FIG. 4, a side view is depicted of two of the suspension systems 10 with the frame rail 12 removed, but with the outboard wheel set 28 shown. In this view the positioning of the brake actuators 24 relative to the wheel sets 26, 28 may be clearly seen.

By positioning the brake actuators 24 rearward of, and longitudinally separated from, the wheel sets 26, 28, multiple brake actuators may be accommodated. Since the brake actuators 24 rotate with the axle 30 about the trunnion beam 14, the disadvantage of this positioning (twisting of the actuator rods 60, not shown in FIG. 4) is eliminated.

In this view it may also be seen how longitudinally compact the suspension systems 10 are. Note how the rear hanger bracket 16 is received in the cavity 20 of the forward trunnion beam 14.

Figure 5:
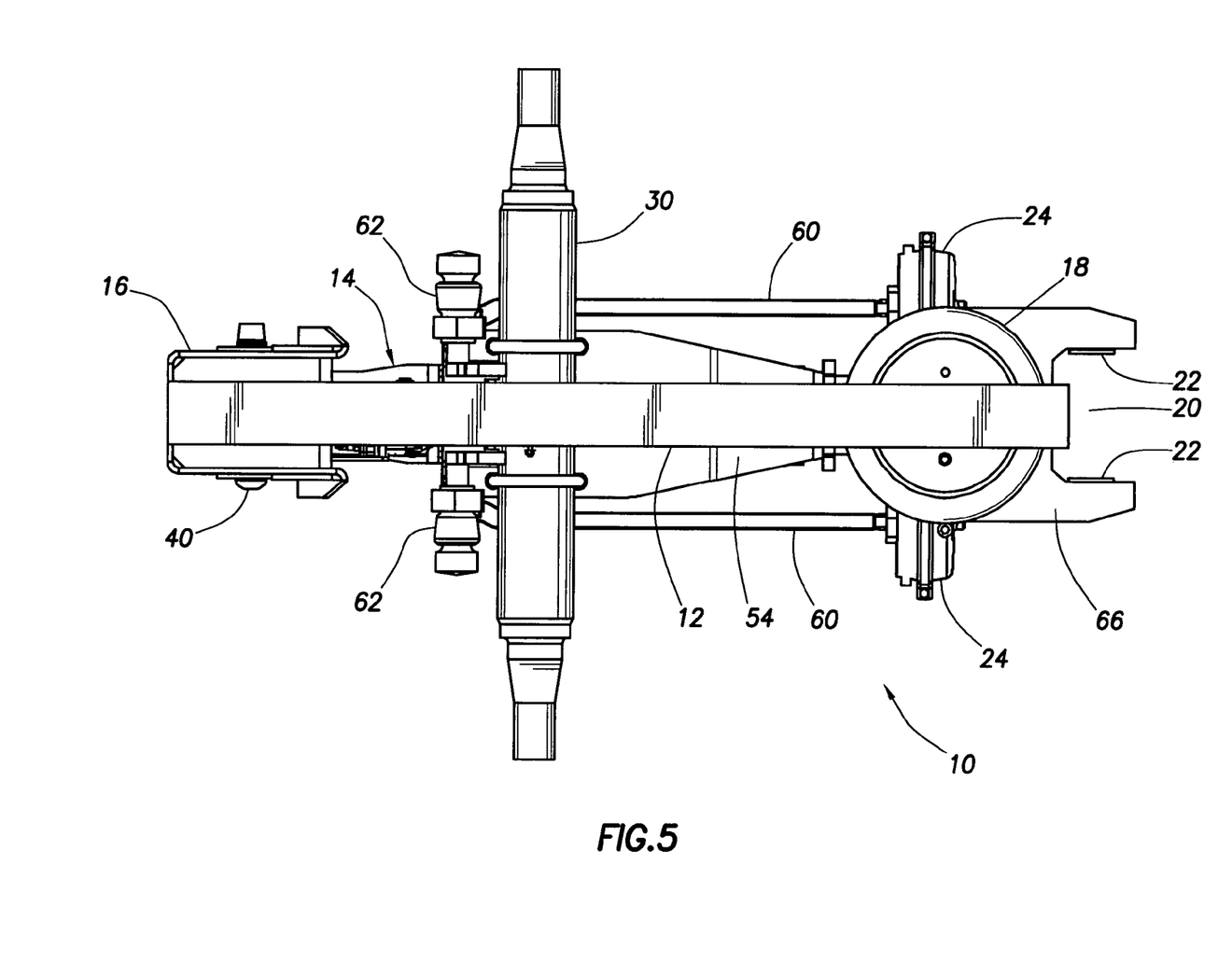
FIG. 5 is a top view of the trunnion suspension system.

Referring now to FIG. 5, a top view of the suspension system 10 is depicted with the wheel sets 26, 28 and associated hubs, brake spiders, etc. removed. In this view the lateral compactness of the suspension system 10 may be seen.

Figure 6:
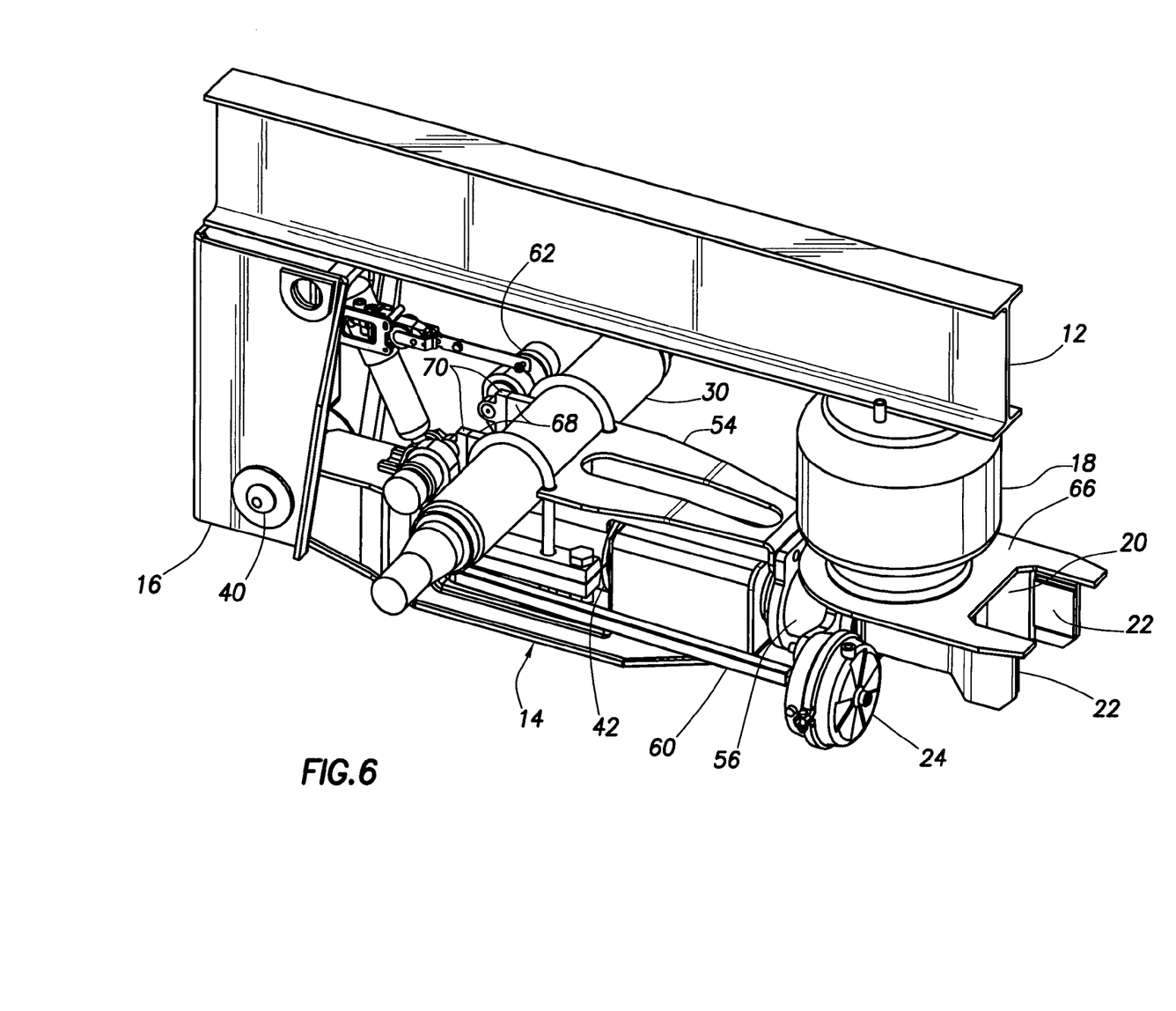
FIG. 6 is an isometric view of the trunnion suspension system.

Referring now to FIG. 6, an isometric view of the suspension system 10 is depicted with the wheel sets 26, 28 removed. In this view the manner in which the brake camshafts 62 are releasably attached to the axle 30 may be seen.

A pivot connection and support 70 is fastened to a boss 68, for example, using threaded bolts. The boss 68 may be attached to the axle 30, for example, by welding. The camshaft 62 is pivotably received in the support 70, enabling it and the arm 64 to be conveniently removed for maintenance, without the need for also removing a hub 82 and drum 84 for each of the wheel sets 26, 28 as in prior trunnion suspension systems.

Figures 7, 9:
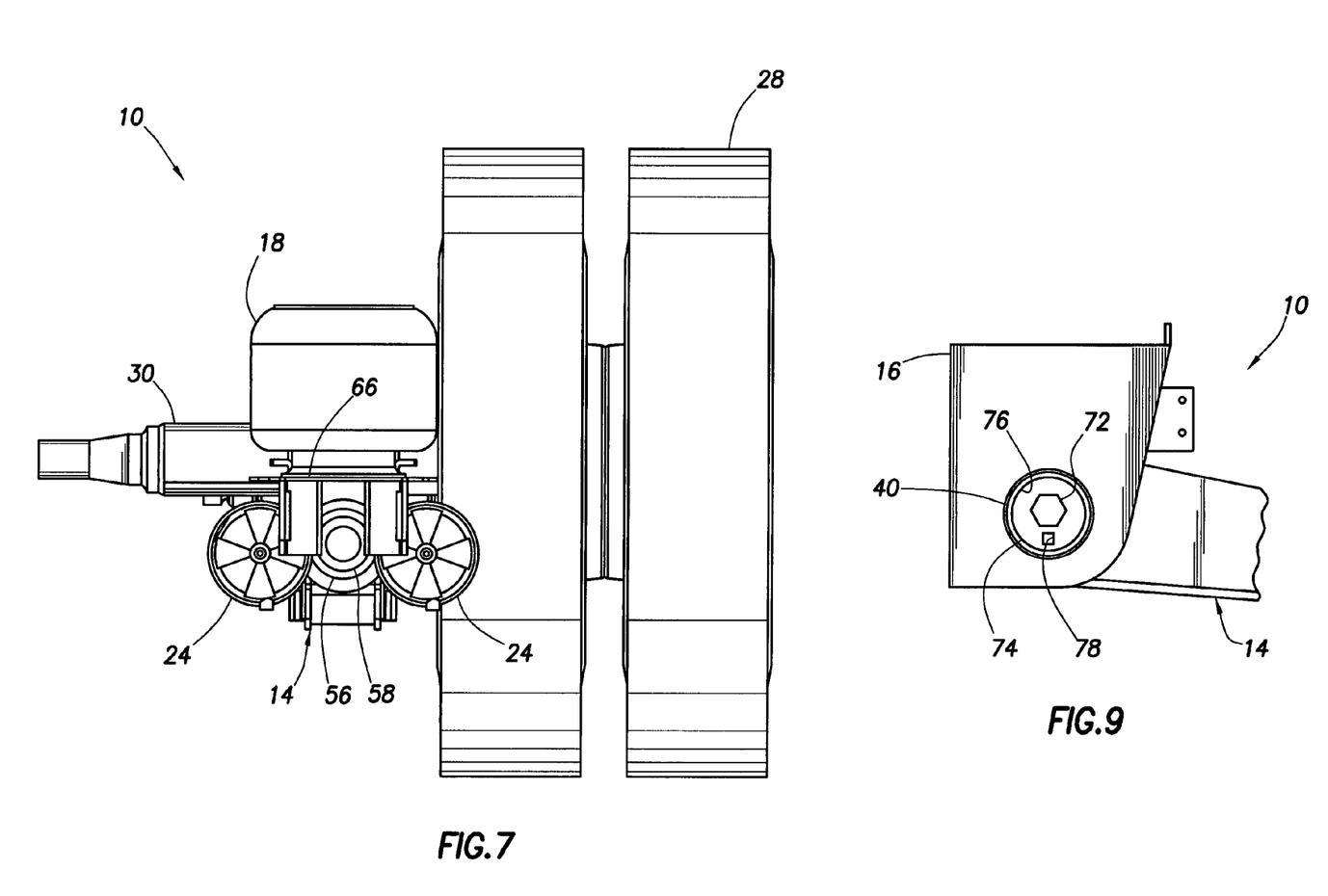
FIG. 7 is a rear view of the trunnion suspension system.
FIG. 9 is a side view of an adjustable hanger bracket pivot connection which may be used in the trunnion suspension system.

Referring now to FIG. 7, a rear view of the suspension system 10 is depicted with the inboard wheel set 26 removed. In this view it may be seen that, if the brake actuators 24 were not positioned so that they are longitudinally separated from the wheel sets 26, 28, then there would be insufficient space between the wheel sets for the brake actuators and the trunnion beam 14.

Figure 8:
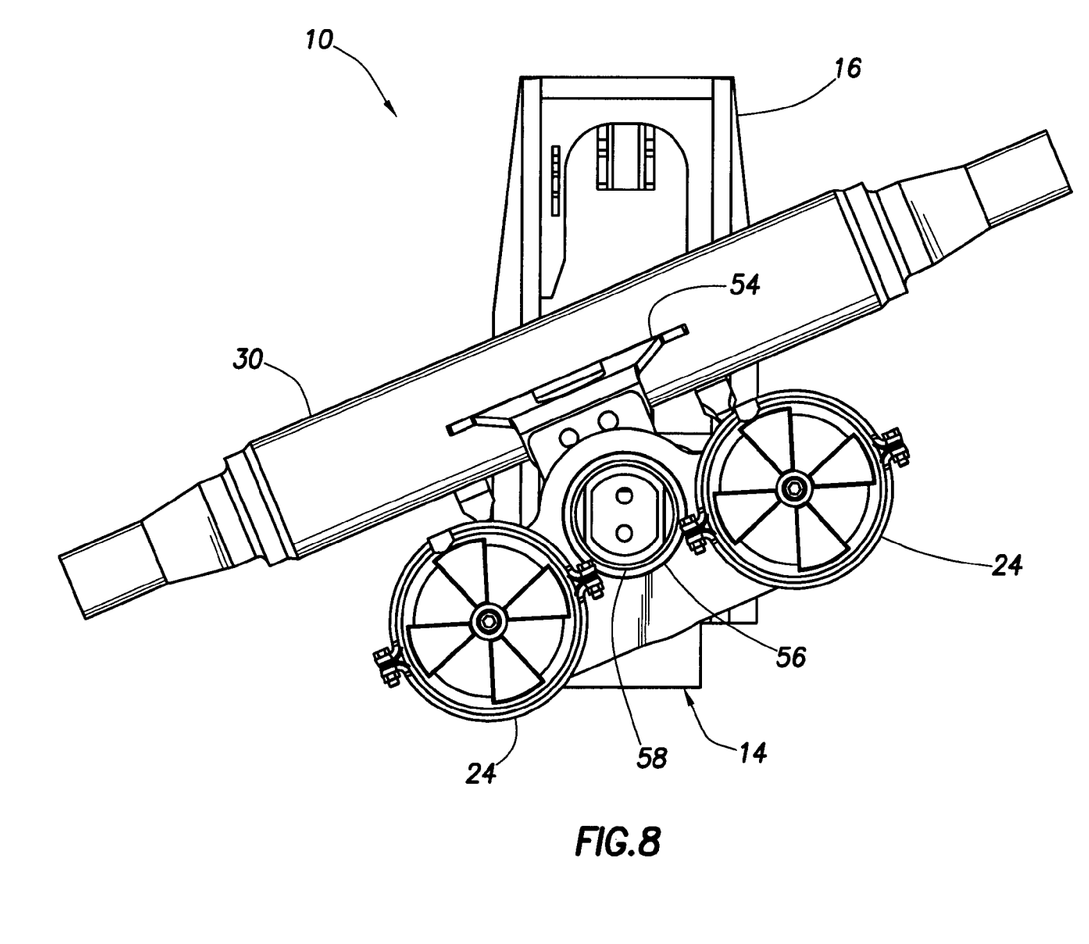
FIG. 8 is a rear view of the trunnion suspension system, with an axle and brake actuators rotated about a trunnion beam of the suspension system.

Referring now to FIG. 8, the suspension system 10 is depicted in a somewhat enlarged rear view with the wheel sets 26, 28, air spring 18 and platform 66 removed. In this view, the axle 30 has been pivoted about the trunnion beam 14. Note that the brake actuators 24 pivot with the axle 30, due to the bracket 54 interconnecting the axle and the brake actuators.

Referring additionally now to FIG. 9, a schematic illustration of the suspension system 10 is provided showing further details of the adjustable pivot connection 40 between the trunnion beam 14 and the hanger bracket 16. Specifically, a fastener 72 (such as a bolt or huck) extends laterally through an eccentric cam 74 received in a circular recess 76.

When the cam 74 is rotated (for example, by using a tool inserted into a square hole 78 in the cam), the fastener 72 is made to displace somewhat longitudinally, thereby also displacing the trunnion beam 14 longitudinally relative to the hanger bracket 16 (and the frame rail 12). In this manner, the various multiple suspension systems 10 which may be used on a vehicle can be longitudinally aligned, so that appropriate ones of the suspension systems are positioned precisely laterally opposite one another, and so that the suspension systems are precisely aligned with the frame rails 12 of the vehicle.

A similar alignment system, and other alignments systems which may be used in the suspension system 10, are described in U.S. Pat. No. 6,131,930, the entire disclosure of which is incorporated herein by this reference. Other alignment systems may be used in keeping with the principles of the present invention.

Of course, a person skilled in the art would, upon a careful consideration of the above description of representative embodiments of the invention, readily appreciate that many modifications, additions, substitutions, deletions, and other changes may be made to these specific embodiments, and such changes are within the scope of the principles of the present invention. Accordingly, the foregoing detailed description is to be clearly understood as being given by way of illustration and example only, the spirit and scope of the present invention being limited solely by the appended claims and their equivalents.

What is claimed is:

1. A trunnion suspension system, comprising:
   a longitudinally elongated trunnion beam pivotably mounted to a hanger bracket;
   an axle pivotably mounted to the trunnion beam;
   a brake actuator secured to the axle and pivotably mounted to the trunnion beam, so that the brake actuator pivots with the axle relative to the trunnion beam; and
   two wheel sets, a wheel set being mounted to each opposite end of the axle, and the brake actuator being mounted to the trunnion beam in a position longitudinally separated from the wheel sets along the trunnion beam.

2. The trunnion suspension system of claim 1, wherein a brake actuator rod extends between the brake actuator and a brake slack adjuster arm, and wherein the brake actuator rod pivots with the axle relative to the trunnion beam.

3. The trunnion suspension system of claim 1, wherein the axle is mounted to a longitudinally extending cylindrical portion of the trunnion beam.

4. The trunnion suspension system of claim 3, wherein the axle is mounted to the cylindrical portion by a bushed connection which encircles the first cylindrical portion.

5. The trunnion suspension system of claim 4, wherein the bushed connection is positioned longitudinally between generally vertical plate portions of the trunnion beam which form shoulders retaining the bushed connection between the plate portions.

6. The trunnion suspension system of claim 4, wherein a bracket is interconnected longitudinally between the bushed connection and a sleeve to which the brake actuator is mounted, the sleeve rotating about the trunnion beam with the axle due to the bracket connected therebetween.

7. A trunnion suspension system, comprising:
   a trunnion beam pivotably mounted to a hanger bracket;
   an axle pivotably mounted to the trunnion beam; and
   a brake actuator secured to the axle and pivotably mounted to the trunnion beam, so that the brake actuator pivots with the axle relative to the trunnion beam,
   wherein the axle is mounted to a first longitudinally extending cylindrical portion of the trunnion beam, and
   wherein the brake actuator is mounted to a second longitudinally extending cylindrical portion of the trunnion beam.

8. The trunnion suspension system of claim 7, wherein the first and second cylindrical portions are longitudinally separated on the trunnion beam, and wherein a longitudinally extending bracket constrains the brake actuator to rotate about the second longitudinally extending cylindrical portion as the axle rotates about the first cylindrical portion.

9. A trunnion suspension system, comprising:
   a trunnion beam pivotably mounted to a hanger bracket, the trunnion beam having a first longitudinally extending cylindrical portion positioned between two generally vertical plate portions;
   an axle pivotably mounted to the first cylindrical portion by a bushed connection, the bushed connection being retained longitudinally between the plate portions; and
   a brake actuator secured to the axle and pivotably mounted to the trunnion beam, so that the brake actuator pivots with the axle relative to the trunnion beam, and
   wherein the brake actuator is mounted to a second longitudinally extending cylindrical portion of the trunnion beam.

10. The trunnion suspension system of claim 9, wherein a brake actuator rod extends between the brake actuator and a brake slack adjuster arm, and wherein the brake actuator rod pivots with the axle relative to the trunnion beam.

11. The trunnion suspension system of claim 10, wherein the slack adjuster arm is attached to a brake camshaft which is releasably secured to the axle.

12. The trunnion suspension system of claim 9, further comprising two wheel sets, wherein a wheel set is mounted to each opposite end of the axle, and wherein the brake actuator is mounted to the trunnion beam in a position longitudinally separated from the wheel sets.

13. The trunnion suspension system of claim 9, wherein a bracket is interconnected longitudinally between the bushed connection and a sleeve to which the brake actuator is mounted, the sleeve rotating about the trunnion beam with the axle due to the bracket connected therebetween.

14. The trunnion suspension system of claim 9, wherein the first and second cylindrical portions are longitudinally separated on the trunnion beam, and wherein a longitudinally extending bracket constrains the brake actuator to rotate about the second cylindrical portion as the axle rotates about the first cylindrical portion.

15. A trunnion suspension system, comprising:
   a trunnion beam pivotably mounted to a hanger bracket, the trunnion beam having a first longitudinally extending cylindrical portion positioned between two generally vertical plate portions; and
   an axle pivotably mounted to the first cylindrical portion by a bushed connection, the bushed connection being retained longitudinally between the plate portions,
   wherein the plate portions form generally vertical legs of a generally U-shaped section of the trunnion beam.

16. The trunnion suspension system of claim 15, wherein the U-shaped section includes a longitudinally extending portion connecting the plate portions, the longitudinally extending portion extending generally parallel to the first cylindrical portion.

17. A trunnion suspension system, comprising:
a trunnion beam pivotably mounted to a hanger bracket, the trunnion beam having a longitudinally extending cylindrical portion positioned between two generally vertical plate portions; and
an axle pivotably mounted to the cylindrical portion by a bushed connection, the bushed connection being retained longitudinally between the plate portions,
wherein an adjustable pivot connection between the trunnion beam and the hanger bracket includes an eccentric cam for varying a longitudinal position of the trunnion beam relative to the hanger bracket.

18. A trunnion suspension system, comprising:
a trunnion beam pivotably mounted to a hanger bracket;
an axle pivotably mounted to the trunnion beam;
a brake camshaft releasably secured to the axle, the brake camshaft being removable from the axle without removal of a brake drum from the axle;
a brake actuator secured to the axle and pivotably mounted to the trunnion beam, so that the brake actuator pivots with the axle relative to the trunnion beam; and
two wheel sets, a wheel set being mounted to each opposite end of the axle, and the brake actuator being mounted to the trunnion beam in a position longitudinally separated from the wheel sets.

19. The trunnion suspension system of claim 18, wherein a slack adjuster arm attached to the brake camshaft is also removable from the axle without removal of the brake drum from the axle.

20. The trunnion suspension system of claim 18, wherein a brake actuator rod extends between the brake actuator and a slack adjuster arm, and wherein the brake actuator rod pivots with the axle relative to the trunnion beam.

21. The trunnion suspension system of claim 18, wherein the axle is mounted to a longitudinally extending cylindrical portion of the trunnion beam.

22. The trunnion suspension system of claim 21, wherein the axle is mounted to the cylindrical portion by a bushed connection which encircles the cylindrical portion.

* * * * *